(12) United States Patent
Bieg et al.

(10) Patent No.: US 6,409,413 B1
(45) Date of Patent: Jun. 25, 2002

(54) LARGE DISPLACEMENT SPHERICAL JOINT

(75) Inventors: Lothar F. Bieg; Gilbert L. Benavides, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/336,182

(22) Filed: Jun. 18, 1999

(51) Int. Cl.$^7$ ................................................ F16C 11/06
(52) U.S. Cl. ........................ 403/115; 403/114; 403/122
(58) Field of Search ................................ 403/113, 114, 403/115, 136, 122

(56) References Cited

U.S. PATENT DOCUMENTS

| | | | |
|---|---|---|---|
| 135,771 A | * 2/1873 | Burtch | 403/122 X |
| 2,029,532 A | * 2/1936 | Karcher | 403/114 |
| 2,126,443 A | * 8/1938 | Begley | 403/114 X |
| 2,643,144 A | * 6/1953 | Schwartz | 403/115 |
| 2,723,571 A | * 11/1955 | Koenig | 403/114 |
| 3,012,798 A | * 12/1961 | Berger | 403/113 |
| 3,037,799 A | * 6/1962 | Mulac | 403/113 |
| 3,072,426 A | * 1/1963 | Gilbert | 403/115 |
| 3,638,243 A | * 2/1972 | Campbell, Jr. et al. | 403/115 |
| 4,473,240 A | * 9/1984 | Sanada | 403/122 X |
| 4,492,488 A | * 1/1985 | Warshawsky | 403/113 |
| 5,755,526 A | * 5/1998 | Stanevich | 403/122 |

* cited by examiner

Primary Examiner—Lynne H. Browne
Assistant Examiner—David E. Bochna
(74) Attorney, Agent, or Firm—Brian W. Dodson

(57) ABSTRACT

A new class of spherical joints has a very large accessible full cone angle, a property which is beneficial for a wide range of applications. Despite the large cone angles, these joints move freely without singularities.

7 Claims, 9 Drawing Sheets

LARGE DISPLACEMENT SPHERICAL JOINT

This invention was made with Government support under Contract DE-AC04-94DP85000 awarded by the U.S. Department of Energy. The Government has certain rights in the invention.

BACKGROUND

The present invention relates generally to joint mechanisms, and more specifically to a new class of large displacement spherical joints. The spherical joint has long been a standard of mechanical design. The general nature of prior art spherical joints is shown in FIG. 1. Here a spherical body 10 makes bearing contact with a bearing cup 12 on a bearing surface 11. The term 'bearing contact' is intended to describe a juxtaposition between two mechanical components which allows them to easily move relative to each other restricted only by the structure of the bearing. The juxtaposition can be surfaces sliding on each other, with or without lubrication, or can be mediated by any of a wide range of conventional bearing elements, such as balls, rollers, and the like. The term 'bearing surface' shall be intended to include the mechanisms which comprise such mediated bearing contacts.

Such bearings generally perform best if bearing surface 11 is spherical in shape, and has a radius substantially equal to that of the spherical body 10, but neither condition is strictly necessary. For example, bearing cup 12 can take the form of a hollow tube, with the bearing surface taking the form of a ring on which the spherical body and the bearing cup make bearing contact. In another example, bearing cup 12 can be replaced by three properly spaced and oriented flat bearing pads, and the resulting bearing surface will have equivalent functionality. Of course, such a bearing surface would be expected to wear at a much faster rate than the illustrated structure.

A first shaft 13 is affixed to spherical body 10, generally but not necessarily aligned along a radius of the spherical body 10. A second shaft 14 can be affixed to bearing cup 12, although other mounting techniques, such as attaching bearing cup 12 to a joint base, can be used. Finally, spherical retainer 15 provides a second bearing surface 16 for spherical body 10. The two bearing surfaces are positioned so that spherical body 10 cannot move, other than through rotation in place, relative to the bearing cup and the spherical retainer.

The structure described above allows considerable freedom of motion of the two shafts relative to each other. Using the orientation of the second shaft as a reference, the first shaft can move freely within a full cone angle α while at the same time rotating freely about its own axis.

The primary restriction on the amount of movement allowed by a spherical joint is the interference between the first shaft and the spherical retainer when an attempt is made to move the first shaft to a position outside the allowed full cone of motion. This interference results from the need to provide a mechanical retainer to keep the spherical body in contact with the bearing cup so that the rotary motion thereof is well-defined.

In most commercially available mechanically restrained spherical joints the available full cone angle α is less than 40 degrees, and examples are simply not available with α>60 degrees. As prior art spherical joints were primarily used to accommodate minor shaft misalignments, the limited full cone angle was not a serious limitation.

There is a variety of prior art spherical joint that allows access to larger full cone angles. In these joints, the spherical retainer does not appear, and the spherical body is held within the bearing cup by magnetic attraction. Such joints, however, cannot tolerate large tensile forces, and are susceptible to dislocation under small dynamic or static forces which do not directly press the spherical body into the bearing cup. Such magnetic spherical joints thus have very limited fields of usage.

New applications for spherical joints have recently arisen for which a large allowed full cone angle is a great advantage. These include many of the parallel mechanisms on which flexible machining platforms and robotic manipulators are now based. In such applications, the greater allowed full cone angle contributes to increasing the workspace of the machine. The result is dramatic increase in efficiency, in large part driven by reducing the total setup time as a workpiece is dismounted and reoriented.

There is a prior art spherical joint that has the potential for providing somewhat larger allowed deflection angles, perhaps to full cone angles as large as 120–140 degrees, although to Applicants knowledge such have not been commercially available. This is the joint described in U.S. Pat. No. 4,628,765, Dien and Luce, issued Dec. 16, 1986 (now expired). In this patent is disclosed a spherical joint comprising a spherical body 20 mounted within a ring-shaped bearing 21 which allows rotation in any direction (see FIG. 2). A pair of semi-circular yokes 22 and 23 oriented along perpendicular axes provide a means to characterize and control the position of a shaft 24 attached to the spherical body. The ring-shaped bearing 21 mechanically retains the spherical body 20 by enclosing a diameter of the spherical body. This, however, has the effect of limiting the allowed deflection angle to values substantially less than 90 degrees. Such a ring-shaped bearing is also difficult and expensive to incorporate into a commercial joint.

There are numerous ways in which a concatenation of revolute joints can be assembled to mimic the behavior of a spherical joint. An example is shown in FIG. 3, where a 'spherical' joint between a first shaft 30 and a second shaft 31 is implemented by combining the effect of a revolute joint 32 imbedded in the end of second shaft 31 with the effect of a revolute fork joint 33 mounted upon revolute joint 32 so that the axis of revolution of the two joints are perpendicular. First shaft 30 is mounted on revolute fork joint 33 via revolute joint 34 so that first shaft 30 is free to turn about its own axis. In this design, three pairs of axles and matching bearings, together with a collection of precision machined and assembled components, are required to mimic the behavior of a spherical joint. In addition, the joint stability which follows naturally from having a spherical body firmly set on an appropriate bearing surface can only be achieved here by insisting on extremely tight manufacturing tolerances. Maintenance, useful life, and other practical considerations fall solidly on the side of the true spherical joint. In the end, even though the joint illustrated in FIG. 3 mimics the behavior of a spherical joint capable of very large deflection angles, in most cases it is not a practical option.

There is a need for a precision spherical joint which is mechanically stable and capable of large (i.e., α>60 degrees) full cone angles while remaining resistant to mechanical joint dislocation. Applicants have addressed this need by developing a new type of spherical joint which satisfies these criteria and more.

SUMMARY

The present invention is of a new type of spherical joint, capable of very large deflection angles. The new joint is similar to conventional spherical joints in that a shaft is (usually) radially fixed to a spherical body, and that spherical body is then confined by bearing surfaces (usually, but not necessarily comprising a concave spherical bearing surface having a spherical radius nearly that of the spherical body) which together define a unique spherical locus which matches the size of the spherical body and within which the spherical body is confined. The new feature is a special type of spherical retainer, containing some of the bearing surfaces, which guides the relative motions of the shaft and the sphere so that the mechanical interferences which limit the accessible deflection angle of conventional spherical joints are relieved or avoided.

DETAILED DESCRIPTION

Figure 1:
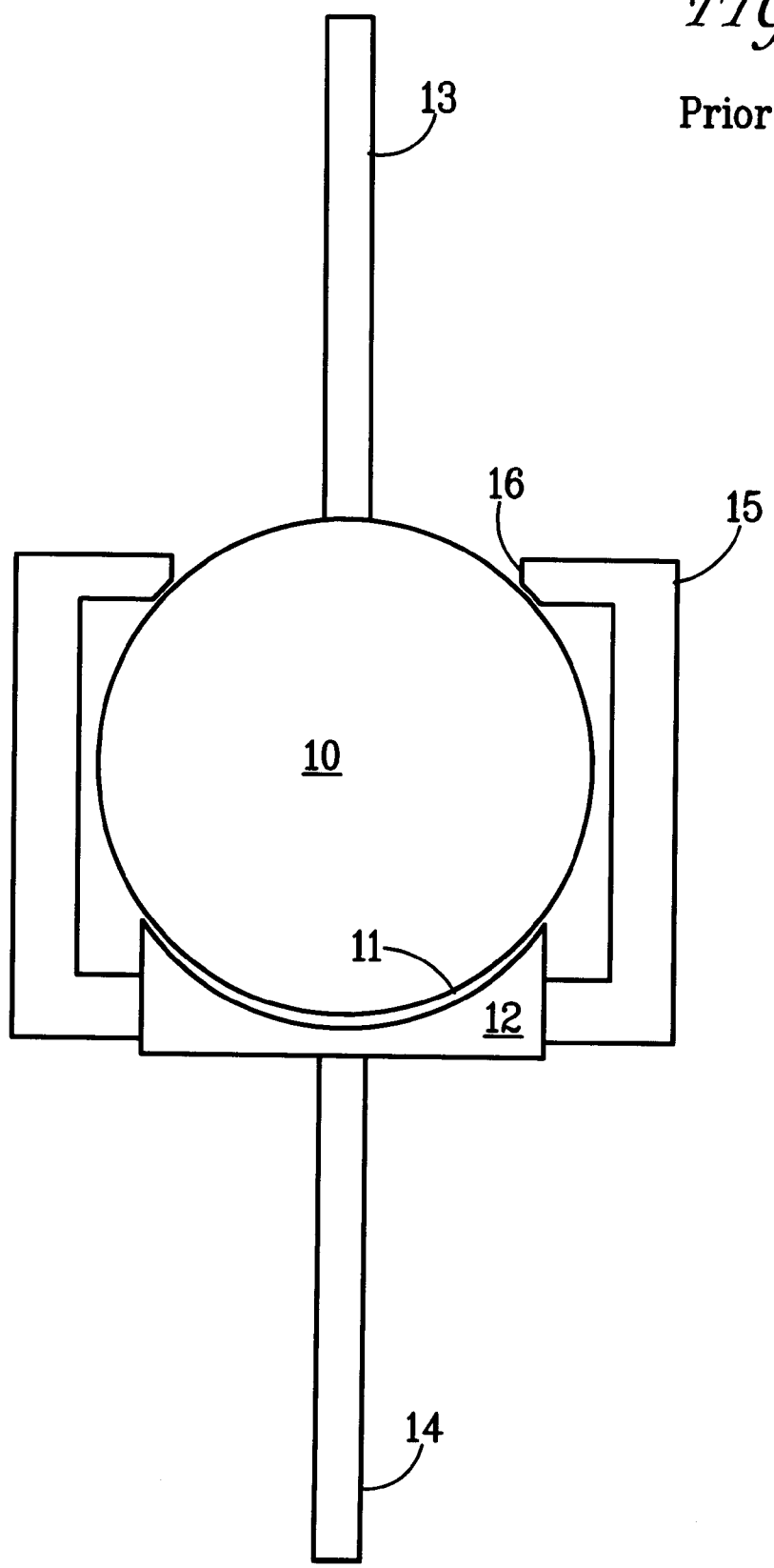
FIG. 1 shows a schematic diagram of a prior art spherical joint.
Figure 2:
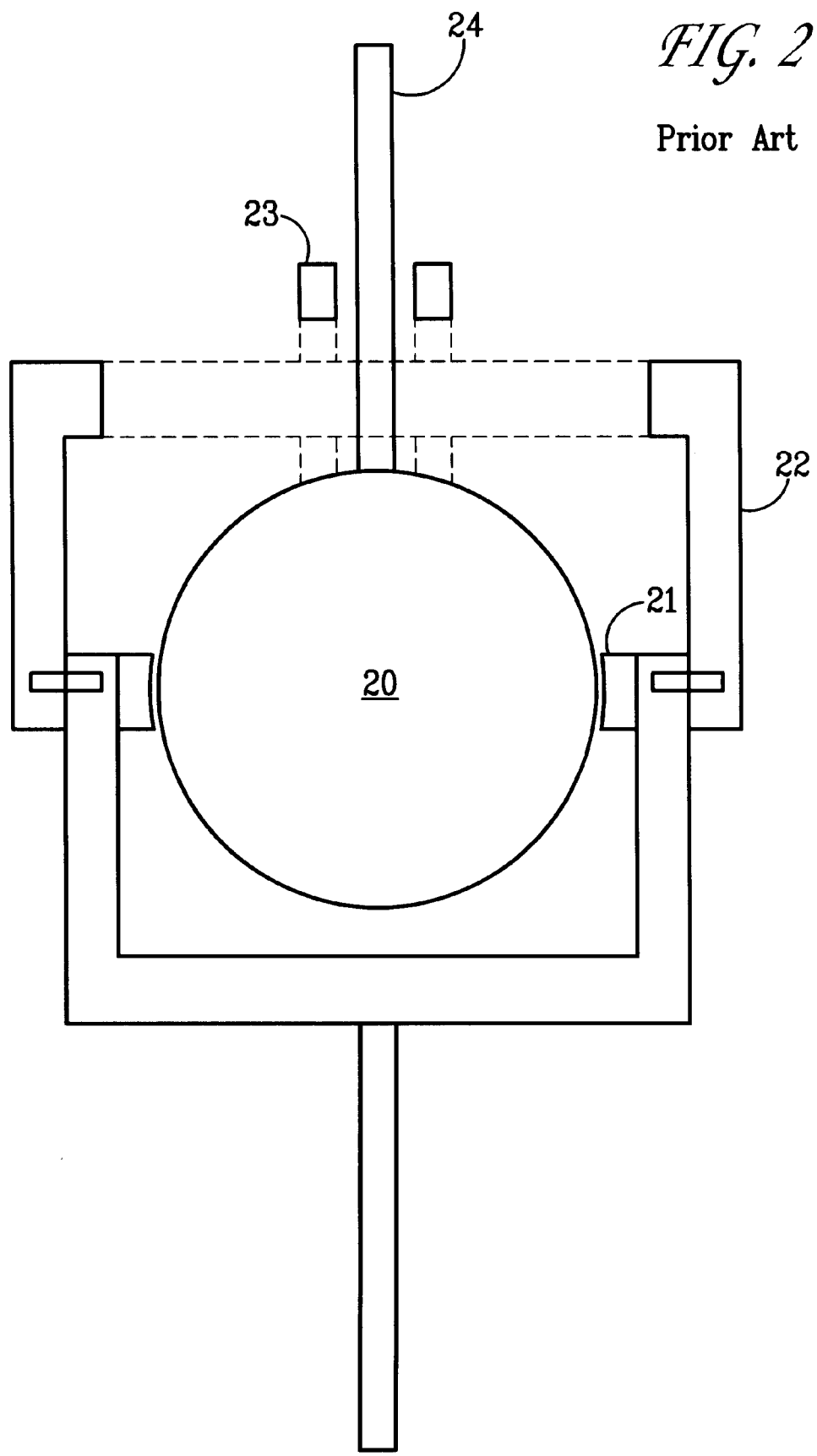
FIG. 2 shows a schematic diagram of a second variety of prior art spherical joint.
Figure 3:
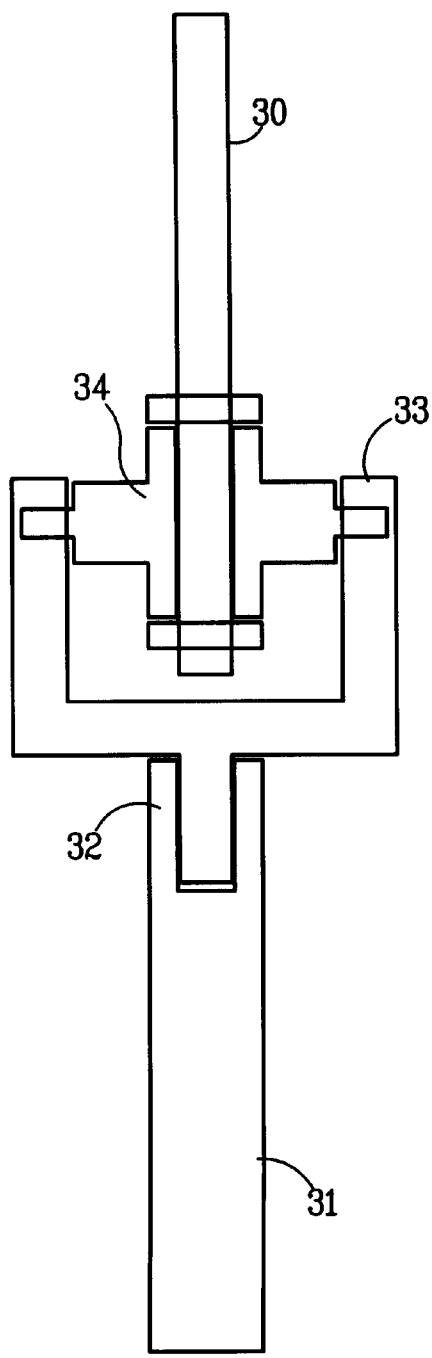
FIG. 3 shows schematically a mechanism which mimics the behavior of a spherical joint using only revolute joints.
Figure 4:
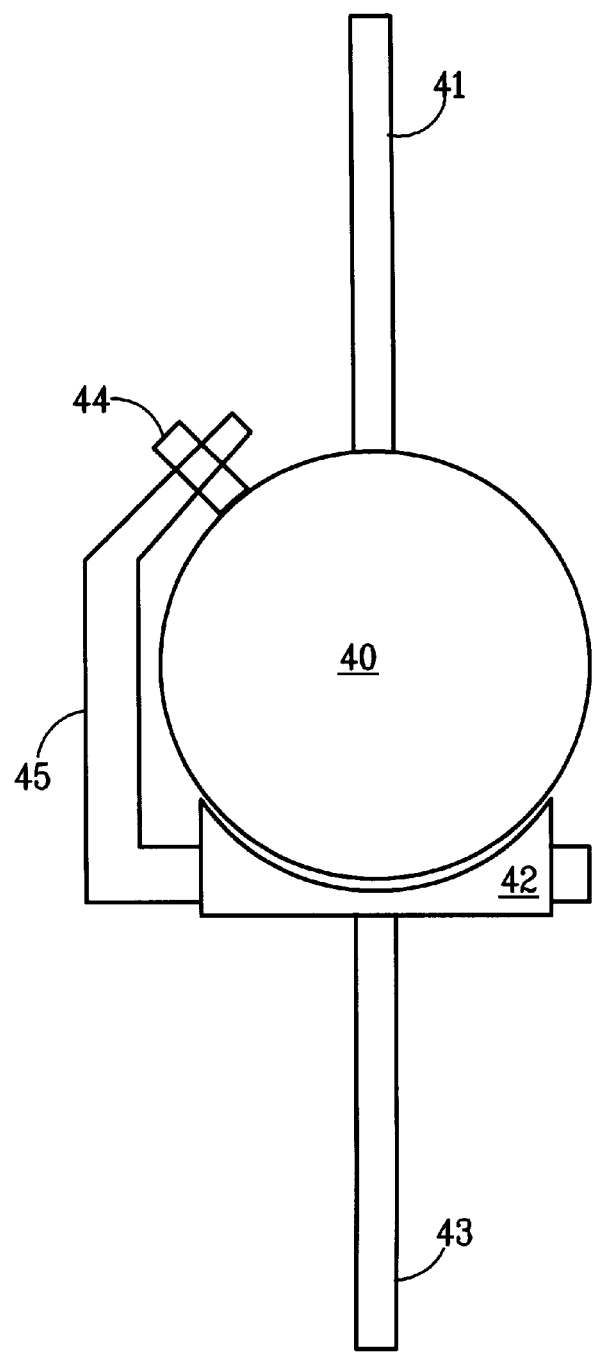
FIG. 4 shows schematically how a large displacement spherical joint based on prior art technology fails.

Begin by illustrating the difficulties encountered when attempting to apply prior art concepts to large displacement spherical joints. FIG. 4 shows a spherical joint which allows access to large deflection angles, but not to large full cone angles. Spherical body 40 has a first shaft 41 radially affixed. Spherical body 40 rides on a bearing cup 42, to which is radially affixed a second shaft 43. (A joint base can be used in place of the second shaft.) Here, radially affixed means that the shaft axis intersects the center of the spherical body when the spherical body is placed on the bearing cup 42. The bearing surface on which the spherical body rides on the bearing cup can take the form of a concave sphere, typically having a radius nearly equal to that of the spherical body. However, a conical bearing surface, or indeed any shape which, while the spherical body rests against the bearing cup, restricts the motion of the spherical body to simple rotations can be used.

A second bearing 44 is positioned so that the spherical body 40 rides on both the bearing cup and the second bearing, and so that the center of the spherical body is thereby constrained to reside at a single point. Note that this requires that the second bearing be located above the diameter of the spherical body 40 which is perpendicular to the axis of the second shaft 43. A C-shaped bearing support structure 45 fixes the relative position of the bearing cup and the second bearing, thereby trapping the spherical body between them, and attaches to the second shaft (or the bearing cup, which attachment is functionally equivalent).

The resulting joint can reach extremely large deflection angles in most directions, the primary restriction being interference between the first shaft and the bearing cup. Unfortunately, this desirable behavior is not seen in all orientations. The first shaft can also interfere with the second bearing and the bearing support structure, thereby preventing function as a true spherical joint. A moment's contemplation will show that such interferences occur in any joint in which the spherical body is retained by the relative positioning of two or more bearings.

The present invention is of a spherical joint in which the spherical body is retained by the relative positioning of two or more bearings, but where additional structure guides and/or restricts the joint motion so as to avoid the resulting interferences.

Figure 5:
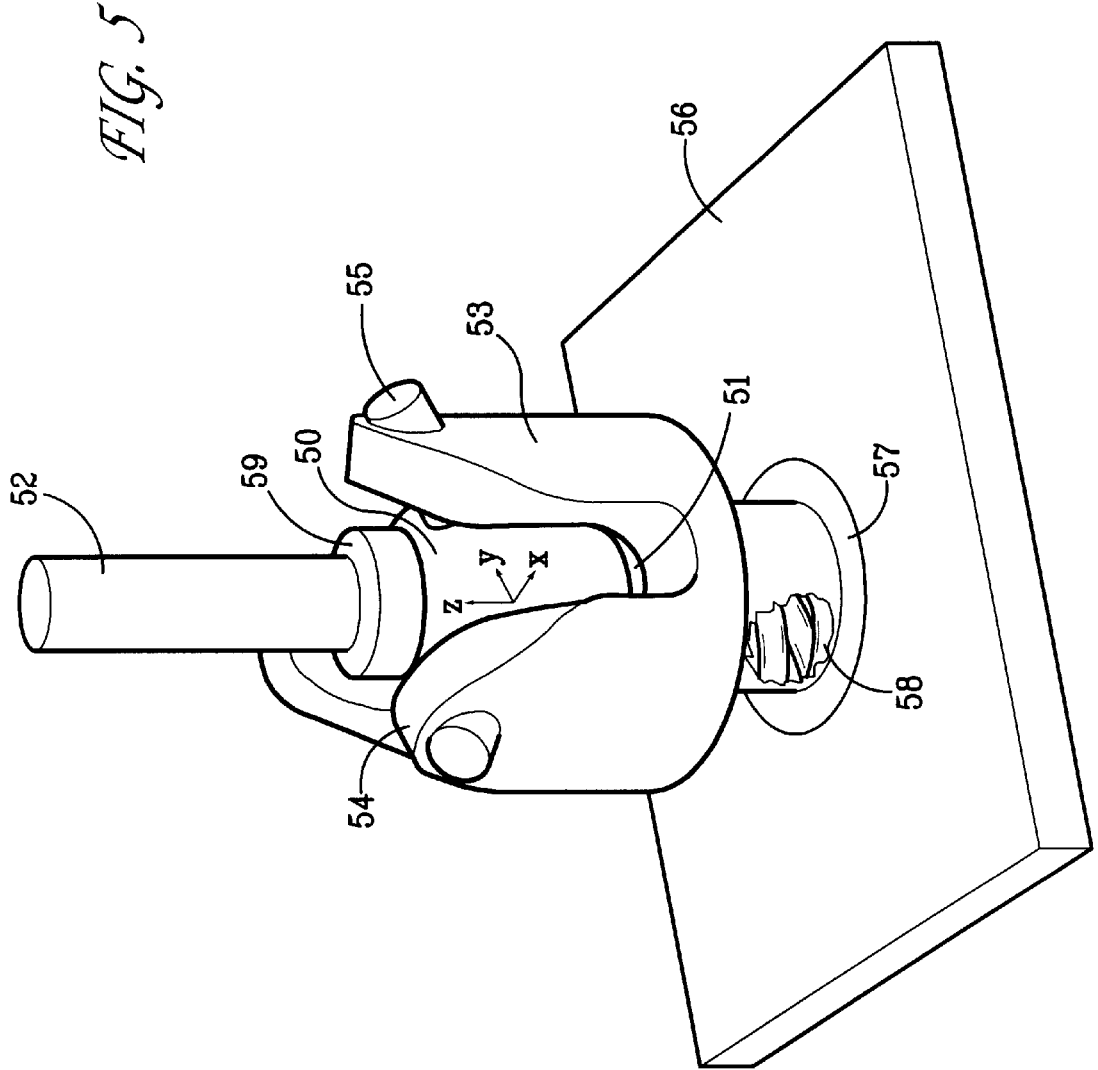
FIG. 5 shows schematically a camming spherical joint.

One implementation of a large displacement spherical joint after the present invention appears in FIG. 5. In this implementation of the present invention, called a camming spherical joint, spherical body 50 has first shaft 52 radially affixed, and rests in bearing cup 51, thereby forming a first bearing surface. The bearing cup and the spherical body are enclosed within camming housing 53. Camming housing 53 comprises a cam surface 54 and at least one mounting site for a bearing pad 55. (As drawn, the joint of FIG. 5 has three bearing pads.) The bearing cup and the bearing pads are positioned so that a spherical bearing surface which matches the spherical body is thereby defined. The bearing cup can be fixed to the joint base 56, or to the camming housing 53. The bearing cup 51 can be spring-loaded with a spring 58 positioned between revolute joint 57 and the bearing cup 51 to maintain positive engagement of the bearing cup 51 with the spherical body 50. Finally, the camming housing 53 is connected to the joint base 56 via revolute joint 57, which allows free rotation of the housing about a vertical axis.

A camming spherical joint according to the present invention is capable of the full 3-axis freedom of a simple spherical joint. Unlike a conventional spherical joint, however, the shaft can rotate by more than 90 degrees about all axes perpendicular to the vertical axis.

To see this, imagine having the first shaft 52 oriented roughly vertically, and then pulling it down toward the joint base. The angle between the first shaft and the vertical is called the deflection angle. When the first shaft strikes the cam surface, the generic situation is that a force is generated perpendicular to the motion of the first shaft. A torque is thereby applied to the camming housing, causing said housing to rotate by means of revolute joint 57 about the vertical. In the process, the shaft is freed to move to still larger deflection angles. As shown in FIG. 5, the lowest part of the cam surface can allow first shaft 52 to move to extremely large full cone angles ($\alpha \sim 150$ degrees).

The motion of the camming spherical joint is nominally free of singularities, owing to the automatic rotation of the camming housing to accommodate large deflection angles. However, given any real cam surface and first shaft, the joint will have a dead point at local extrema of the cam surface. The dead points associated with cam surface extrema which are also local minima are expected, and serve to define the largest possible deflection angles.

Other types of dead points, however, those associated with maxima and inflection points, interfere with the desired function of the joint. Even though such dead points can be made very small, they still reflect differences in function relative to a conventional spherical joint.

There are several ways to mitigate or eliminate the effects of these dead points. The simplest is to design the cam surface to have a sharp structure near the local maxima, and harden the surface of the first shaft. This is a brute force approach to minimizing the angular extent of the dead point, but is rather expensive in machining and heat treatment. Similar approaches which minimize but do not eliminate the effects of such dead points include adding a freely rotating collar 59 around the first shaft, or a bearing wheel or ball at the dead points, so that the first shaft rolls more easily away from the dead points. Those points, however, remain in such joints.

Figure 6:
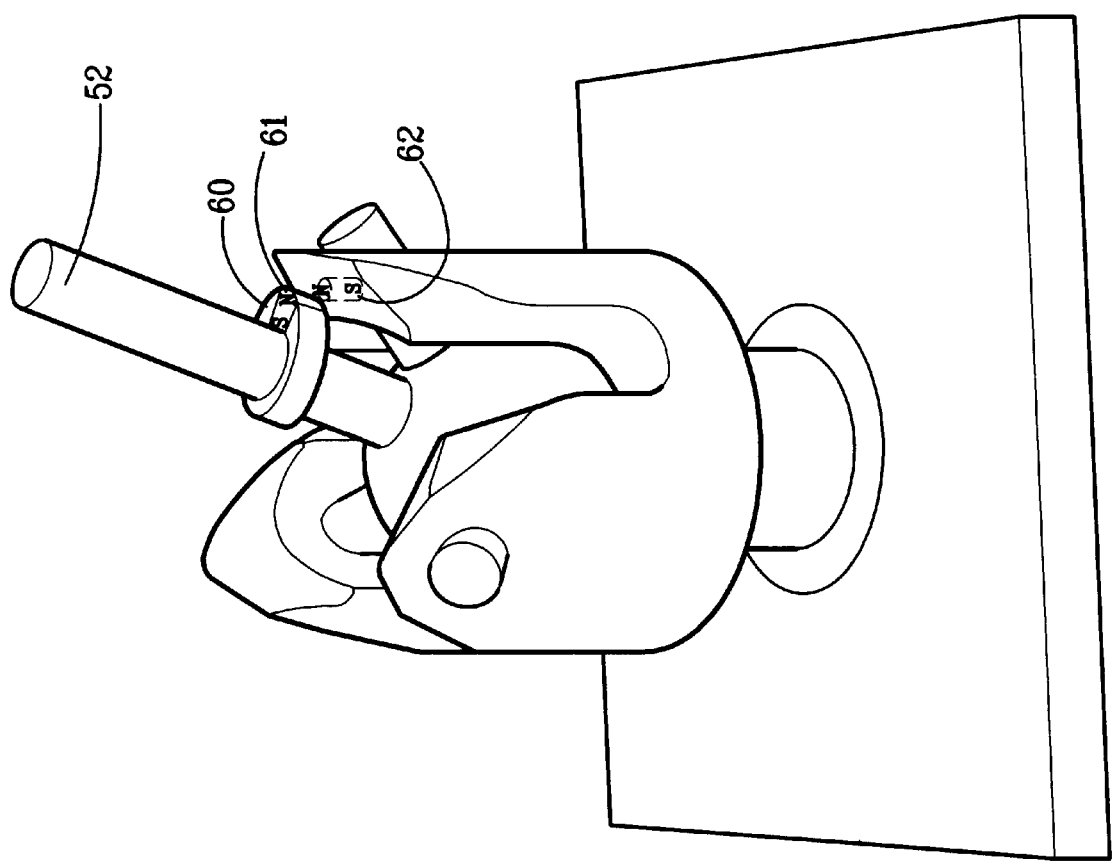
FIG. 6 shows schematically a camming spherical joint with a magnetic eccentric cam.

A second approach to avoiding the effects of dead points appears in FIG. 6. This figure shows a camming spherical joint as in FIG. 5, but also including a magnetized eccentric cam 60 which engages the cam surface and is free to rotate about the first shaft. If the surface of the eccentric cam hits a local maximum of the cam surface (which would otherwise be a dead point), eccentric cam 60 rotates, thereby presenting an oblique surface to the cam surface and sliding down the cam surface away from the potential dead point.

The eccentric cam, however, also has dead points when interacting with the cam surface. These can be avoided by arranging an appropriate magnetic interaction between the magnetized eccentric cam and the camming housing near the potential dead points. One way to accomplish this is to embed a first magnetic deflector 61 into the cam surface near a dead point, and embed a second magnetic deflector 62 of opposite polarity into the eccentric cam, again near a dead point. As the eccentric cam and the dead point approach, the repulsion of the magnetic deflectors causes the eccentric cam to rotate, thereby moving the dead point of the cam away from the cam surface.

Figure 7:
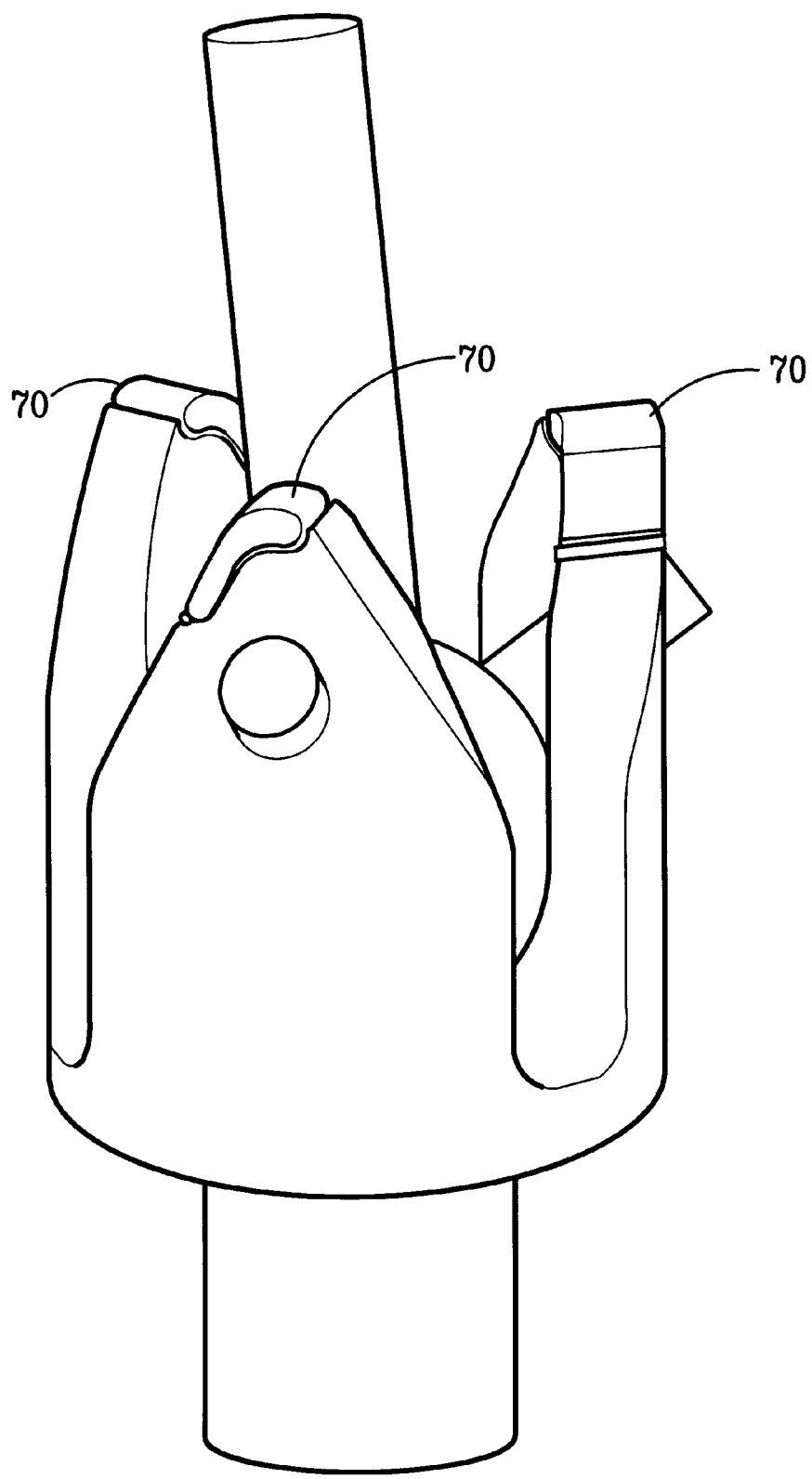
FIG. 7 shows schematically a camming spherical joint with flappers.

Another approach toward avoiding the problem of dead points at local maxima of the cam surface is shown in FIG. 7. Here again appears a camming spherical joint as in FIG. 5, but now the regions of the camming housing near what would otherwise be dead points of the cam surface are replaced by a flapper 70. This flapper is attached to the camming housing so that it is relatively free to move about the connection point, and is spring-loaded so it has an equilibrium position at some angular displacement away from the housing. This can be allowed by attaching the flapper by a spring loaded revolute joint (not shown). Alternately, the flapper can be an integral part of the camming housing, where flexure of the long axis of the flapper provides both the required rotary motion and the spring-loaded restoring force.

If the first shaft strikes what would have been a dead point, the flapper rotates. In doing so, the angle of its surface changes, thereby altering the perpendicular orientation of a dead point into an oblique contact that produced forces which torque the camming housing around its axis. As a result, no dead point is encountered.

Figure 8:
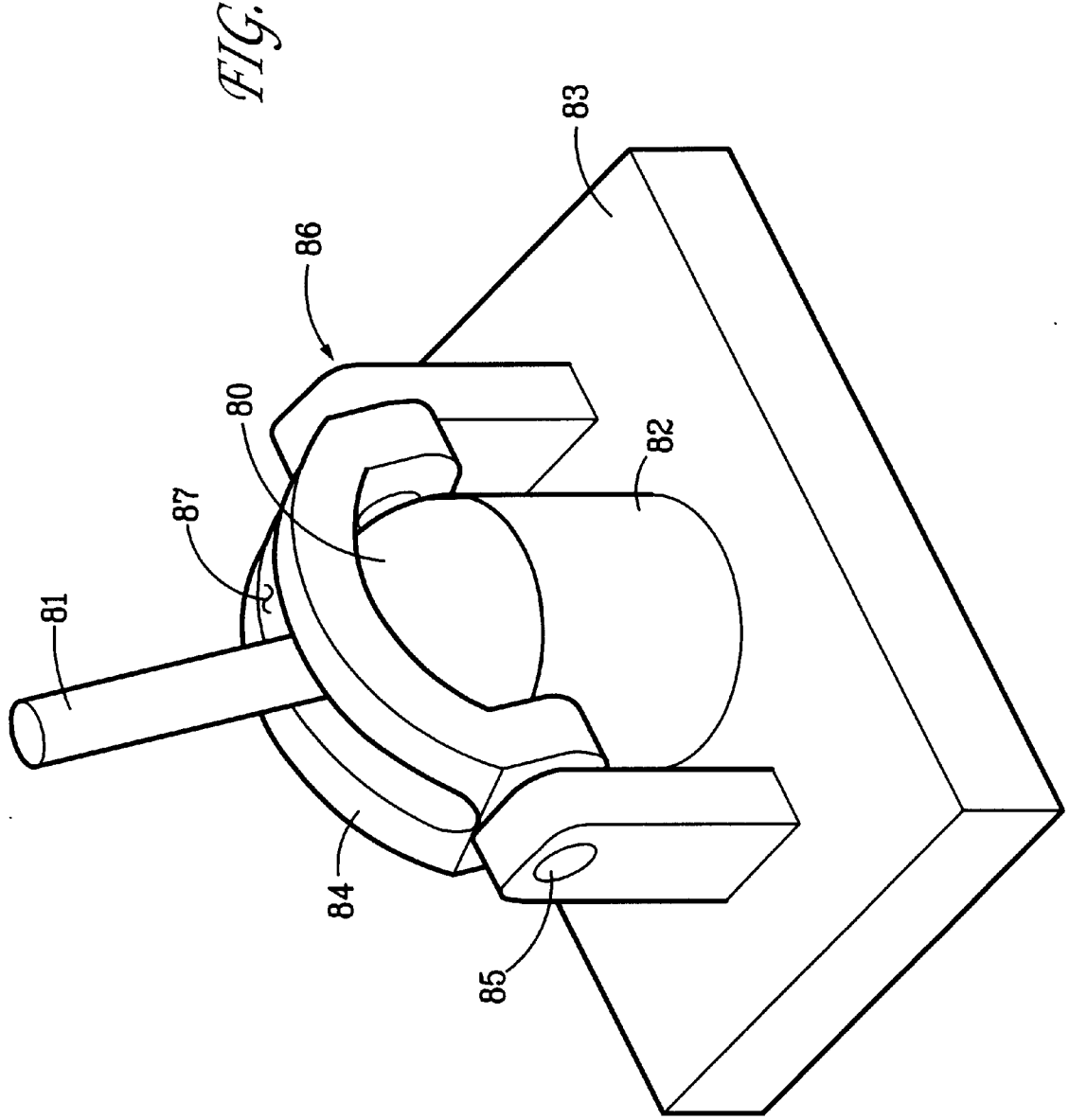
FIG. 8 shows schematically an arching band spherical joint.

A closely related group of large displacement spherical joints according to the present invention appears in FIG. 8. These are the arching band spherical joints, which in some ways are the simplest of this new class of large displacement spherical joints.

A spherical body 80, with a radially affixed first shaft 81, rides on a bearing cup 82 attached to a joint base 83. An arching band 84 is mounted to the joint base by means of a pair of revolute joints 85 and 86. These revolute joints share a common axis of revolution, and that axis passes through the center of the spherical body when it rests on the bearing cup. The underside of the arching band 84 comprises a bearing surface that contacts the spherical body. Hence, the bearing cup and the underside of the arching band make up the two bearings that confine the spherical body and restrict it to rotary motion about its own center. The arching band 84 comprises an elongated aperture 87, through which the first shaft penetrates.

The operation of an arching band spherical joint is straightforward. For motions of the first shaft along the arching band, the deflection angle is limited to about 75–80 degrees by the presence of the revolute joints 85 and 86. Rotation of the first shaft in a perpendicular direction is limited only by material interference with the bearing cup of the joint base, and can be in excess of 150 degrees given proper design. The actual full cone angle accessible to such a joint is thus only about 160 degrees, even though in some directions cone angles as large as 300 degrees are possible.

Although the total amount of spherical motion allowed by the arching band spherical joints is generally less than that of the other implementations, this type of design is well-suited to integration with motors or other activators and/or motion encoders. As a result, arching band spherical joints can be a better choice for numerous robotic and machine tool applications than are the alternate implementations of the present invention.

Figure 9:
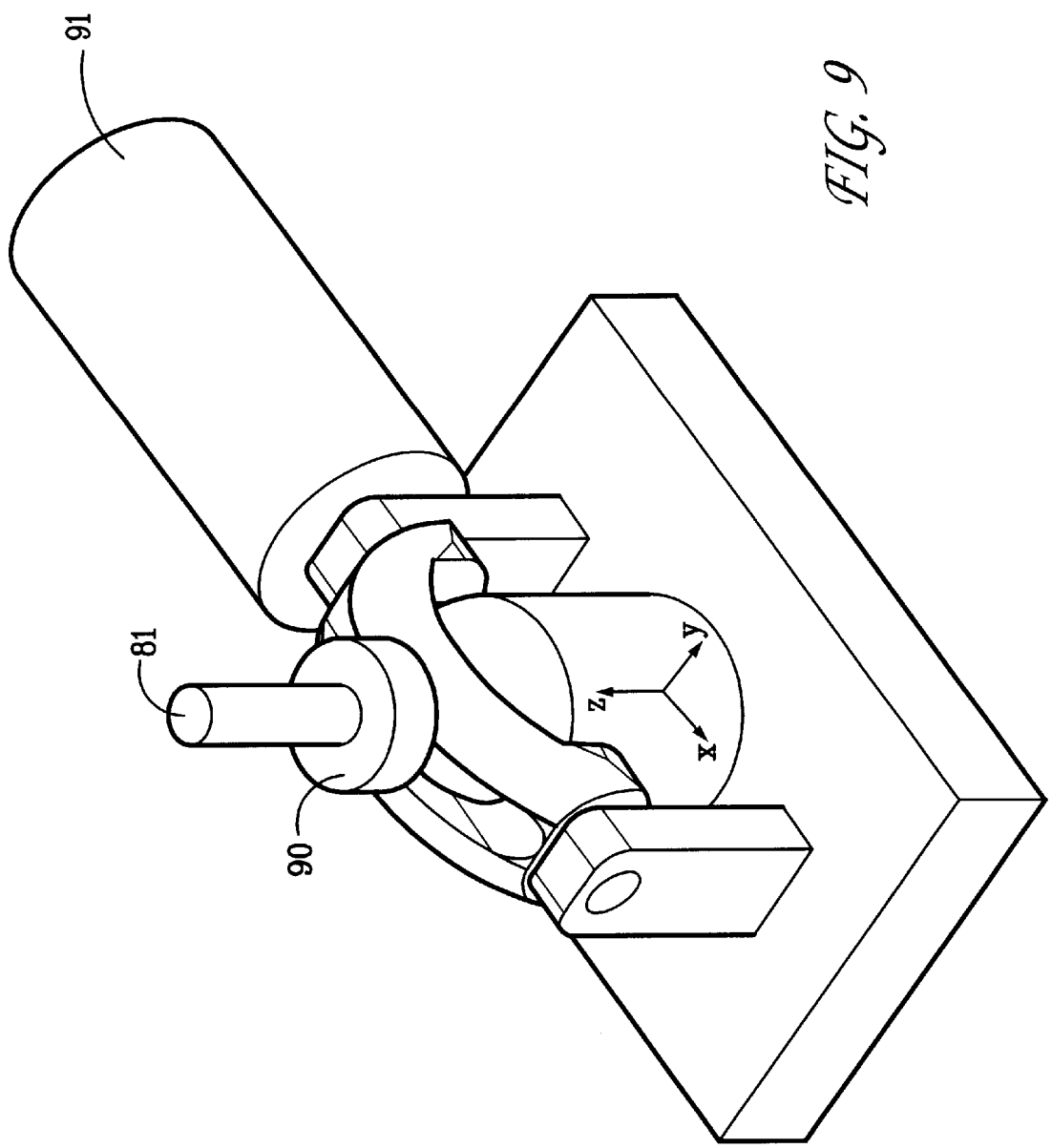
FIG. 9 shows schematically an arching band spherical joint with shaft bearing.

It should be noted that when the arching band is tilted near or past the horizontal (with reference to FIG. 8), the degree of confinement is reduced, and the joint becomes susceptible to dislocation. This tendency can be countered by adding a shaft bearing 90 to the first shaft, positioned directly on top of the arching band, as shown in FIG. 9, which also shows a motor 91 driving the motion of the joint in one axis of rotation. This cap pins the first shaft and the spherical body into location, so that dislocations of the joint will not occur.

Figure 10:
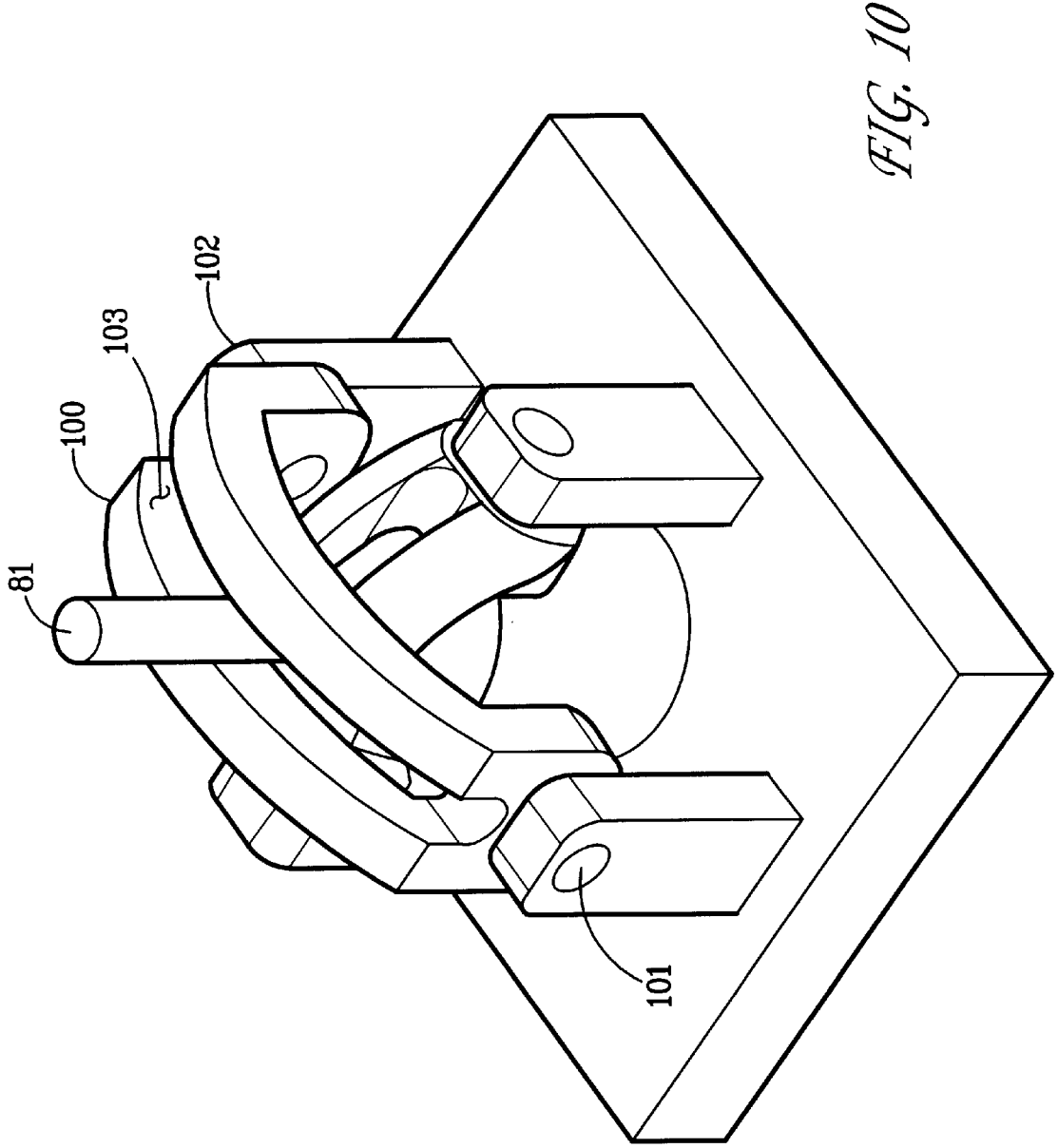
FIG. 10 shows schematically a double arching band spherical joint.

In order to have a spherical joint such that the orientation of the first shaft can be completely controlled or measured, a second arching band 100 comprising an elongate aperture 103 mounted on revolute joints 101 and 102 can be added to the above joint (see FIG. 10). The second arching band is usually oriented perpendicular to the first, and the common axis of rotation of the revolute joints 101 and 102 intersects the center of the spherical body, but neither of these are requirements for proper function, as the spherical motion is already defined by the first arching band. In fact, depressing the common axis of rotation of the revolute joints 101 and 102 can relieve the interference between the first shaft and the second arching band so that adding the second arching band need not significantly limit the angular flexibility of the joint.

The examples and implementations described above are intended to illustrate various aspects of the present invention, not to limit the scope thereof. The scope of the invention is set by the claims interpreted in view of the specification.

What is claimed is:

1. A spherical joint, comprising:
   a) a spherical body;
   b) a first shaft affixed to said spherical body;
   c) a camming housing having a vertical axis, the camming housing comprising a cam surface that is substantially oblique to the vertical axis and is positioned to functionally engage with the first shaft;
   d) a plurality of bearings positioned about and restricting the motion of said spherical body relative to the camming housing to rotations about the center of the spherical body, wherein a first bearing of said plurality of bearings comprises a bearing cup affixed to the camming housing;
   e) a revolute joint between the camming housing and a joint base; and, said joint base whereby when said first shaft functionally engages said camming housing a force is generated responsive to the motion of said first shaft and a resulting torque causes said camming housing to rotate about said vertical axis on said revolute joint.

2. The spherical joint of claim 1, wherein the bearing cup is spring-loaded.

3. A spherical joint, comprising:
 a) a spherical body;
 b) a first shaft affixed to said spherical body;
 c) a camming housing having a vertical axis, the camming housing comprising a cam surface that is substantially oblique to the vertical axis and is positioned to functionally engage with the first shaft;
 d) a plurality of bearings positioned about and restricting the motion of said spherical body relative to the camming housing to rotations about the center of the spherical body, wherein a first bearing of said plurality of bearings comprises a bearing cup affixed to the joint base;
 e) a revolute joint between the camming housing and a joint base; and,
 f) said joint base whereby when said first shaft functionally engages said camming housing a force is generated responsive to the motion of said first shaft and a resulting torque causes said camming housing to rotate about said vertical axis on said revolute joint.

4. The spherical joint of claim 3, wherein the bearing cup is spring-loaded.

5. A spherical joint, comprising:
 a) a spherical body;
 b) a first shaft affixed to said spherical body;
 c) a camming housing, comprising a cam surface positioned to functionally engage with the first shaft;
 d) a plurality of bearings positioned about and restricting the motion of said spherical body relative to the camming housing to rotations about the center of the spherical body;
 e) a revolute joint between the camming housing and a joint base; and
 f) the joint base whereby when said first shaft functionally engages said camming housing a force is generated responsive to the motion of said first shaft and a resulting torque causes said camming housing to rotate about said revolute joint, and wherein said cam surface possesses at least one dead point where engagement with the first shaft does not drive rotation of the camming housing and wherein the first shaft is steered away from the at least one dead point by magnetic interaction between the first shaft and the camming housing.

6. The spherical joint of claim 5, wherein the first shaft further comprises a magnetized eccentric cam affixed to the first shaft by a rotary bearing, the camming housing further comprises a magnetic deflector positioned near the at least one dead point of the cam surface, said magnetic deflector acting to twist said magnetized eccentric cam so as to prevent the first shaft from accessing said dead point.

7. A spherical joint, comprising:
 a) a spherical body;
 b) a camming housing having a vertical axis, the camming housing comprising a cam surface that is substantially oblique to the vertical axis and is positioned to functionally engage with a first shaft, and said cam surface possesses at least one dead point where engagement with the first shaft does not drive rotation of the camming housing;
 c) said first shaft affixed to said spherical body, said first shaft further comprising a freely rotating collar positioned so as to functionally engage the cam surface;
 d) a plurality of bearings positioned about and restricting the motion of said spherical body relative to the camming housing to rotations about the center of the spherical body;
 e) a revolute joint between the camming housing and a joint base; and,
 f) said joint base whereby when said first shaft functionally engages said camming housing a force is generated responsive to the motion of said first shaft and a resulting torque causes said camming housing to rotate about said vertical axis on said revolute joint.

* * * * *